US012211264B2

(12) United States Patent
Ma et al.

(10) Patent No.: US 12,211,264 B2
(45) Date of Patent: Jan. 28, 2025

(54) OPTICAL SATELLITE REMOTE SENSING TRANSFER CALIBRATION METHOD BASED ON NEAR SPACE AEROSTAT (71) Applicant: Aerospace Information Research Institute, Chinese Academy of Sciences, Beijing (CN)

(72) Inventors: Lingling Ma, Beijing (CN); Ning Wang, Beijing (CN); Geer Teng, Beijing (CN); Qiang Liu, Beijing (CN); Yongguang Zhao, Beijing (CN); Jingmei Li, Beijing (CN); Taihua Zhang, Beijing (CN); Yanchu Yang, Beijing (CN); Yaokai Liu, Beijing (CN); Caixia Gao, Beijing (CN); Wan Li, Beijing (CN); Lu Ren, Beijing (CN); Guangzhou Ouyang, Beijing (CN); Yifang Niu, Beijing (CN)

(73) Assignee: Aerospace Information Research Institute, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/681,638

(22) PCT Filed: Apr. 22, 2022

(86) PCT No.: PCT/CN2022/088473
§ 371 (c)(1),
(2) Date: Feb. 6, 2024

(87) PCT Pub. No.: WO2023/159739
PCT Pub. Date: Aug. 31, 2023

(65) Prior Publication Data
US 2024/0265697 A1 Aug. 8, 2024

(30) Foreign Application Priority Data
Feb. 28, 2022 (CN) .......................... 202210189336.1

(51) Int. Cl.
*G06V 20/13* (2022.01)
*G06T 7/80* (2017.01)
(Continued)

(52) U.S. Cl.
CPC ................ *G06V 20/13* (2022.01); *G06T 7/80* (2017.01); *G06V 10/25* (2022.01); *G06V 10/761* (2022.01)

(58) Field of Classification Search
CPC ...... G06V 20/13; G06V 10/25; G06V 10/761; G06T 7/80
See application file for complete search history.

(56) References Cited

U.S. PATENT DOCUMENTS 6,931,198 B1 * 8/2005 Hamada ................. H04N 7/163
  386/314
6,952,737 B1 * 10/2005 Coates .................. G06F 16/182
  711/100

(Continued)

FOREIGN PATENT DOCUMENTS

CN 104482939 A 4/2015
CN 105975777 A 9/2016

(Continued)

OTHER PUBLICATIONS

Zhang translation of CN 113177512 May 20, 2021 (Year: 2021).*

(Continued)

*Primary Examiner* — Zaihan Jiang
(74) *Attorney, Agent, or Firm* — Merchant & Gould P.C.

(57) ABSTRACT

An optical satellite remote sensing transfer calibration method based on near-space aerostat, including: performing a temporal-spatial matching between first observation image data of a target region collected by a benchmark radiometric payload and second observation image data of the target region collected by a satellite-borne payload, to obtain a (Continued)

plurality of matchups of observation image data (S1); obtaining an average radiance of the benchmark radiometric payload from a plurality of first observation image data (S2); obtaining an average DN captured by the satellite payload in the target region from a plurality of second observation image data (S3); obtaining a matching radiance for an observation band of the benchmark radiometric payload corresponding to the satellite payload based on the average radiance of the benchmark radiometric payload (S4); and obtaining a calibration coefficient of the satellite payload based on the matching radiance and the average DN (S5).

8 Claims, 2 Drawing Sheets

(51) Int. Cl.
*G06V 10/25* (2022.01)
*G06V 10/74* (2022.01)

(56) References Cited

U.S. PATENT DOCUMENTS

| | | | | |
|---|---|---|---|---|
| 2005/0123278 | A1* | 6/2005 | Yamashita | G11B 27/034 |
| 2005/0152296 | A1* | 7/2005 | Lee | H04N 21/4381 |
| | | | | 370/312 |
| 2005/0180580 | A1* | 8/2005 | Murabayashi | G11B 27/28 |
| | | | | 382/173 |
| 2005/0232242 | A1* | 10/2005 | Karaoguz | H04N 21/4126 |
| | | | | 370/352 |
| 2005/0240756 | A1* | 10/2005 | Mayer | G06F 9/4418 |
| | | | | 713/2 |
| 2010/0008595 | A1* | 1/2010 | Riley | G06V 20/13 |
| | | | | 382/254 |
| 2022/0260725 | A1* | 8/2022 | Schiller | G01S 19/235 |

FOREIGN PATENT DOCUMENTS

| | | | |
|---|---|---|---|
| CN | 107656289 | A | 2/2018 |
| CN | 113177512 | * | 5/2021 |
| CN | 113177512 | A | 7/2021 |
| CN | 113532652 | A | 10/2021 |
| CN | 113920203 | A | 1/2022 |
| JP | H07159172 | A | 6/1995 |
| RU | 2432554 | C1 | 10/2011 |
| WO | WO-2019049324 | * | 9/2017 |

OTHER PUBLICATIONS

Peng DevelopmentoftheChineseSpace-BasedRadiometricBenchmark1-10 MissionLIBRA Jul. 8, 2020 (Year: 2020).*
Nagare translation of WO 2019049324 Sep. 8, 2017 (Year: 2017).*
International Search Report and Written Opinion issued for International Patent Application No. PCT/CN2022/088472 dated Nov. 3, 2022 (12 pages including English Translation of ISR).
First Office Action dated May 16, 2023 for Chinese Application No. 202210189336.1 (13 pages including English Translation).
Han Qijin, et al., "Cross-validation and Calibration of ZY-1 02C PMS Sensor Using GF-1 Satellite", Spacecraft Recovery & Remote Sensing, 2015, 36:1, pp. 73-80.
Peng Zhang, et al., "Development of the Chinese Space-Based Radiometric Benchmark Mission LIBRA", Remote Sens., 2020, 12:2179, pp. 2-17.
Hu Sheng-Min, et al., "Research on In-orbit Calibration of Remote-sensing Instrument Based on Aerostat", Infrared, http://journal.sitp.ac.cn/hw, 2013, 34:4, pp. 14-18.
Yao-Kai Liu, et al., On-orbit radiometric calibration of the optical sensors on-board SuperView-1 satellite using three independent methods, Optics Express, 2020, 8:28, pp. 1-21.

* cited by examiner

OPTICAL SATELLITE REMOTE SENSING TRANSFER CALIBRATION METHOD BASED ON NEAR SPACE AEROSTAT

CROSS-REFERENCE TO RELATED APPLICATIONS

This application is a Section 371 National Stage Application of International Application No. PCT/CN2022/088473, filed on Apr. 22, 2022, and which claims priority to Chinese Patent Application No. 202210189336.1, filed on Feb. 28, 2022, and the contents of which are incorporated herein by reference in their entireties.

TECHNICAL FIELD

The present disclosure relates to the field of aerospace remote sensing technology, specifically focusing on an optical satellite remote sensing transfer calibration method based on a near-space aerostat.

BACKGROUND

A remote sensing satellite is an important means to rapidly, efficiently and cost-effectively obtaining geophysical properties and states of atmosphere, land and ocean, both at regional and global scales. These satellites play a crucial role in providing insights into human activities and their impact on the Earth's system. The precise detection of physical quantities across different layers of the Earth's spheres has placed unprecedented demands on the accuracy of remote sensing radiometric measurements. However, after satellites have been launched into space, the performance of satellite remote sensors will be degraded due to the cosmic radiation, the aging of the sensors, or other factors. The method that compares the observation data from remote sensing satellites with the data from the radiometric calibration sources is used to trace the observations back to the benchmarks. The radiometric calibration sources have characteristics of high stability, reliability, and traceability. This is an important approach for ensuring the accuracy and consistency of observations made by different remote sensing satellite payloads or by the same payload at different times. However, since the on-orbit calibration after the remote sensing satellite payload is launched is different to trace, and the ground-based calibration relying on measurements from in-situ targets is affected by uncertainty factors such as scale effects, atmospheric correction, and environmental changes, the issue of precision and consistency in on-orbit calibration of remote sensing satellite payloads remains a pressing challenge.

SUMMARY

An aspect of the present disclosure provides an optical satellite remote sensing transfer calibration method based on a near-space aerostat, including:
performing a temporal-spatial matching between first observation image data of a target region collected by a benchmark radiometric payload and second observation image data of the target region collected by a satellite-borne payload, so as to obtain a plurality of matchups of observation image data, wherein the benchmark radiometric payload is carried by the near-space aerostat, and each of the matchups of observation image data comprises the first observation image data and the second observation image data, with matching conducted both in terms of time and spatial location;
obtaining an average radiance of the benchmark radiometric payload from a plurality of first observation image data within the plurality of matchups of observation image data;
obtaining an average DN (digital number) captured by the satellite payload in the target region from a plurality of second observation image data within the plurality of matchups of observation image data;
obtaining a matching radiance for an observation band of the benchmark radiometric payload corresponding to the satellite payload based on the average radiance of the benchmark radiometric payload; and
obtaining a calibration coefficient of the satellite payload based on the matching radiance and the average DN.

According to embodiments of the present disclosure, the obtaining a calibration coefficient of the satellite payload based on the matching radiance and the average DN includes:
obtaining a theoretical radiance of the satellite payload based on the matching radiance; and
obtaining the calibration coefficient of the satellite payload based on the theoretical radiance and the average DN.

According to embodiments of the present disclosure, the calibration coefficient includes a calibration gain coefficient and a calibration offset coefficient;
where the obtaining the calibration coefficient of the satellite payload based on the theoretical radiance and the average DN includes:
processing the theoretical radiance and the average DN by using a least squares method, so as to obtain the calibration gain coefficient and the calibration offset coefficient of the satellite payload.

According to embodiments of the present disclosure, a method of determining the target region includes:
acquiring position data and attitude data of the space aerostat;
obtaining an observation beam direction of the benchmark radiometric payload to the target region based on the position data and the attitude data;
determining a spatial position where an observation beam intersects with a ground based on the observation beam direction; and
determining the target region according to the spatial position.

According to embodiments of the present disclosure, the determining a spatial position where an observation beam intersects with a ground based on the observation beam direction includes:
step A: determining an average elevation plane of the target region;
step B: determining an initial intersection point between the observation beam and the average elevation plane based on the observation beam direction;
step C: determining a first elevation for the initial intersection point in a DEM (digital elevation model) and a corresponding first elevation plane for the initial intersection point;
step D: replacing an intersection point between the observation beam direction and the first elevation plane as the initial intersection point;
step E: determining a second elevation for the updated initial intersection point in the DEM and a corresponding second elevation plane for the updated initial intersection point; and step F: repeating the iterative process from step C to step E until a difference between the second elevation and the first elevation is less than a first predefined threshold, and using the initial intersection point obtained in the final iteration as the spatial position where the observation beam intersects with the ground.

According to embodiments of the present disclosure, the obtaining an average radiance of the benchmark radiometric payload from a plurality of first observation image data within the plurality of matchups of observation image data includes:

obtaining a plurality of radiance of benchmark radiometric payload from the plurality of first observation image data within the plurality of matchups of observation image data, wherein each of the first observation image data corresponds to one of the radiance of the benchmark radiometric payload; and obtaining the average radiance of the benchmark radiometric payload based on the plurality of radiance of benchmark radiometric payload.

According to embodiments of the present disclosure, the obtaining an average DN captured by the satellite payload in the target region from a plurality of second observation image data within the plurality of matchups of observation image data includes:

extracting DNs of different channels of a plurality of pixels in the target region from the plurality of second observation image data within the plurality of matchups of observation image data; and obtaining the average DN of the target region collected by the satellite payload based on the DNs of the different channels of the plurality of pixels.

According to embodiments of the present disclosure, the temporal matching includes:

for each of the matchups of observation image data, a difference value between an acquisition time of the first observation image data and an acquisition time of the second observation image data being less than a second predefined threshold.

According to embodiments of the present disclosure, the obtaining an average DN captured by the satellite payload in the target region from a plurality of second observation image data within the plurality of matchups of observation image data includes:

determining a plurality of pixels within the target region from the plurality of second observation image data, wherein each of the pixels correspond to a plurality of channels; and determining, for each channel of the plurality of channels, an average value of DNs for a plurality of pixels corresponding to the channel, so as to obtain the average DN corresponding to the channel.

According to embodiments of the present disclosure, a flight altitude range of the near-space aerostat is between 18 km to 50 km; and spectral resolution of visible-near infrared of the benchmark radiometric payload is less than 5 nm, and spectral resolution of short-wave infrared of the benchmark radiometric payload is less than 10 nm.

DESCRIPTION OF SYMBOLS 1 near-space aerostat
  11 aerostat sphere
  12 power subsystem
  13 flight control subsystem
  14 telemetry and control subsystem
  15 platform equipment pod
  16 deployment and retrieval subsystem
2 benchmark radiometric payload unit
  21 space environment protection module
  22 benchmark radiometric payload
  23 space benchmark radiometric payload

DETAILED DESCRIPTION OF EMBODIMENTS

Based on research in the relevant field, concepts such as "TRUTHS", "CLARREO", and space radiometric benchmark research programs have been proposed. These initiatives aim to relocate radiation benchmarks to space-based remote sensing satellites, forming "calibration satellites", which are satellites used to calibrate other satellites. The "calibration satellites" acquires benchmark data for ground targets by observing ground targets simultaneously with other remote sensing satellites. This benchmark data is then used to perform on-orbit calibration for other remote sensing satellites, ensuring the precision and traceability of in orbit radiometric calibration. Typically, "calibration satellites" are designed as low Earth orbit (LEO) satellites to ensure that the benchmark data acquired for ground targets has high spectral and spatial resolution. This allows for cross-calibration with multiple remote sensing satellites. However, this approach reduces the opportunities for synchronous or quasi-synchronous observations with other remote sensing satellites. Relying on a limited number of matchups makes it challenging to eliminate randomness caused by variations in underlying surface characteristics, atmospheric disturbances, and spatiotemporal matching errors. This difficulty hinders the effective reduction of uncertainties in the calibration process, limiting the practical benefits of radiometric benchmark transfer calibration.

The near-space aerostat can operate within the near-space range of 18 to 50 kilometers. At altitudes above this range, the atmospheric impact on atmospheric radiative transfer remains relatively stable. Conversely, the influence of the complex spatiotemporal variations in the troposphere, which lies below this altitude range, on atmospheric radiative transfer can be observed by the benchmark radiometric payload. Therefore, the transfer calibration process based on near-space aerostats closely approximates the working conditions of a "calibration satellite". At the same time, compared with low-orbit "calibration satellites", the near-space aerostat also offers the following advantages: 1) Near-space aerostats can achieve regional patrol observation. By adjusting their flight altitude to match wind conditions, they can conduct repeated observations within a regional area. This facilitates cross-comparisons with different remote sensing satellites; 2) Near-space aerostats are recoverable, making it convenient to calibrate the benchmark radiometric payload before and after flights. This provides better assurance for the traceability of the reference sensor.

Therefore, considering the above advantages, an optical remote sensing benchmark radiometric transfer calibration system based on a near-space aerostat is established. Specifically, it offers a solution that utilizes a benchmark radiometric payload carried by a near-space aerostat to observe radiance in the same area as the payload of remote sensing satellites. This observed radiance serves as a calibration reference for remote sensing satellites and forms the basis for transfer calibration with other remote sensing satellites. Compared to conventional ground-based calibration methods, ground-based calibration requires simultaneous observations of surface-emitted radiance and the synchronous observation of atmospheric conditions. It uses radiative transfer simulations to account for the comprehensive effects of atmospheric absorption and scattering on surface-emitted radiance, thereby estimating the theoretical true value of radiance that should be observed at satellite altitudes, which are then used as calibration references. Atmospheric conditions, due to their significant temporal and spatial variability, often become the main source of uncertainty in ground-based calibration. Simulating the absorption and scattering effects of the entire atmosphere introduces its own uncertainties. In contrast, the radiance data observed at the observation altitudes of near-space aerostats inherently reflect the comprehensive impact of the atmosphere on surface-emitted radiance along the radiative transfer path. Therefore, this system effectively reduces uncertainties in the radiometric benchmark transfer process, has good traceability, enables high frequency cross-matching with multiple satellites, enhances the radiometric calibration accuracy of multiple remote sensing satellite series, and ensures data quality consistency among various satellites.

Further explanations of the embodiments disclosed in this application will be provided below, accompanied by the accompanying figures.

Figure 1:
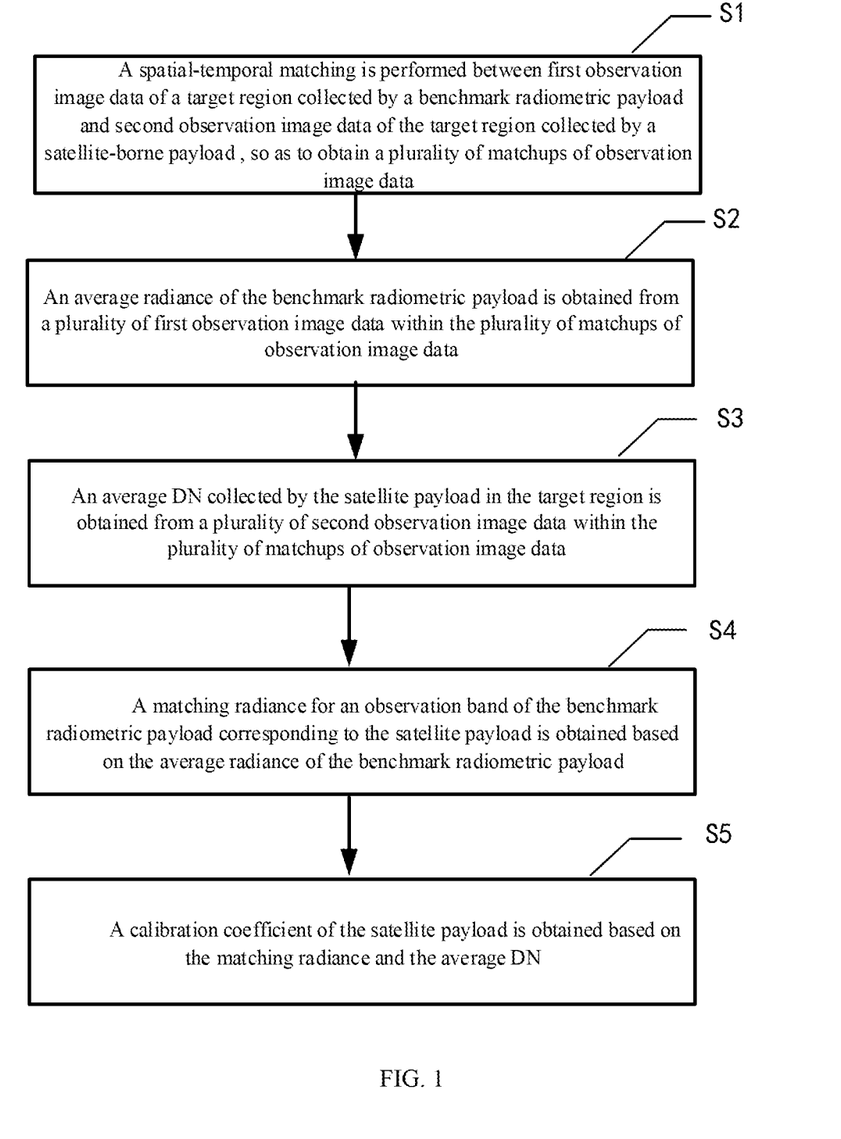
FIG. 1 schematically shows a flowchart of an optical satellite remote sensing transfer calibration method based on a near-space aerostat according to embodiments of the present disclosure.

FIG. 1 schematically shows a flowchart of an optical satellite remote sensing transfer calibration method based on a near-space aerostat according to embodiments of the present disclosure.

As shown in FIG. 1, the step includes step S1 to step S5.

In step S1, the first observation image data of the target region collected by the benchmark radiometric payload and the second observation image data of the target region collected by the satellite-borne payload are temporally and spatially matched to obtain a plurality of matchups of observation image data. In each matchup of observation image data, the benchmark radiometric payload is carried by the near-space aerostat, and it includes both temporally matched and spatially matched first observation image data and second observation image data.

In step S2, the average radiance of the benchmark radiometric payload is obtained from a plurality of first observation image data within the plurality of matchups of observation image data.

In step S3, the average DN captured by the satellite payload in the target region is obtained from a plurality of second observation image data within the plurality of matchups of observation image data.

In step S4, the matching radiance for the observation band of the benchmark radiometric payload corresponding to the satellite payload is obtained based on the average radiance of the benchmark radiometric payload.

In step S5, a calibration coefficient for the satellite payload is obtained by using the matching radiance and the average DN.

According to embodiments of the present disclosure, the benchmark radiometric payload is described as follows: It has been experimentally calibrated and can operate normally in the near-space environment (traceable measurement range: pressure from 3 kPa to normal atmospheric pressure of 101 kPa, temperature from −70° C. to 20° C.). It can be traced back to laboratory benchmark radiometric standards and is essentially a spectral radiance measurement payload, such as a spectral radiometer or an imaging spectrometer. The benchmark radiometric payload has multiple channels, covering the spectral range typically observed by most remote sensing satellites (generally including the visible, near-infrared, and shortwave infrared spectral bands). It provides a reference for comparison to remote sensing satellites (referred to as satellites). Additionally, the benchmark radiometric payload has undergone calibration under different environmental conditions in a laboratory, ensuring that measurements in the near-space environment can be traced back to laboratory standards.

According to the embodiments disclosed in this application, the near-space aerostat operates within the altitude range of 18 km to 50 km. Above this altitude, the atmosphere has a relatively constant impact on atmospheric radiative transfer, while the atmospheric variations in the lower troposphere, which are more complex, can be observed by the benchmark radiometric payload carried by the near-space aerostat. This significantly reduces the uncertainty caused by atmospheric factors in traditional alternative calibration processes, thus enhancing the precision of calibration for remote sensing satellites. The flight altitude of the near-space aerostat is relatively lower compared to satellites, resulting in higher spatial resolution for Earth observation targets, which facilitates comparisons with high-resolution satellites.

According to the embodiments disclosed in this application, the use of a near-space aerostat as a platform to carry the benchmark radiometric payload provides the advantage of regional patrol observation, increasing opportunities for cross-matching with remote sensing satellites. Additionally, the near-space aerostat has the advantage of being recoverable, making it convenient to calibrate the benchmark radiometric payload before and after flight, providing better assurance for traceability to the reference. These embodiments serve as an effective supplement to the "calibration satellite" while reducing the cost of remote sensing satellites. They also serve as an early verification technique for the benchmark radiometric payload of the "calibration satellite".

According to embodiments of the present disclosure, the step S1 includes steps S11 to S12.

In step S11, the target region is determined.

According to embodiments of the present disclosure, S11 may include steps S11 to S114.

In step S11, the position and attitude data of the benchmark radiometric payload when collecting data in the target region is obtained.

Temporal matching and an interpolation are performed based on acquisition time of a benchmark radiometric payload carried by the near-space aerostat and data acquisition time recorded by a POS system, and the position data and the attitude data of the near-space aerostat at time of data acquisition are accurately calculated through differential GPS post-processing.

In step S112, an observation beam direction of the benchmark radiometric payload to the target region is obtained based on the position data and the attitude data.

The determination of the observation beam direction in the target region of the benchmark radiometric payload carried by the near-space aerostat is the primary input for subsequent field-of-view determination. The determination of the observation beam direction requires the support of spatial position and attitude information of the benchmark radiometric payload. At a specific moment, the spatial position information of the near-space aerostat is obtained through the Global Positioning System (GPS) or Beidou system, while the attitude information of the benchmark radiometric payload is determined by the Inertial Navigation System (INS). By utilizing the spatial arrangement of the benchmark radiometric payload and the Position and Orientation System (POS) relative to each other, the observation beam direction of the benchmark radiometric payload can be determined. The observation equation is as follows:

$$\vec{s} = R_{ins2wgs84}\vec{\rho}\begin{bmatrix}\cos\beta\cos\alpha\\ \cos\beta\sin\alpha\\ \sin\beta\end{bmatrix} + \begin{bmatrix}X_{wgs84}\\ Y_{wgs84}\\ Z_{wgs84}\end{bmatrix} \text{ in which:} \quad (1)$$

$$R_{ins2wgs84} = \begin{bmatrix}\cos\omega & -\sin\omega & 0\\ \sin\omega & \cos\omega & 0\\ 0 & 0 & 1\end{bmatrix}\begin{bmatrix}\cos\varphi & 0 & \sin\varphi\\ 0 & 1 & 0\\ -\sin\varphi & 0 & \cos\varphi\end{bmatrix}\begin{bmatrix}1 & 0 & 0\\ 0 & \cos\kappa & -\sin\kappa\\ 0 & \sin\kappa & \cos\kappa\end{bmatrix} \quad (2)$$

In the equation (1), $\vec{s}$ represents a direction vector of the observation beam of the benchmark radiometric payload in a WGS84 coordinate system, $\vec{\rho}$ is a direction vector of the benchmark radiometric payload with a body as a coordinate system, $[X_{wgs84}\ Y_{wgs84}\ Z_{wgs84}]T$ represents a coordinate of the POS system in the WGS84 coordinate system, $R_{ins2wgs84}$ represents an attitude matrix of the POS system, $\omega$, $\varphi$ and $\kappa$ are attitude angles of the POS system during the flight, which are a yaw angle, a pitch angle and a roll angle, respectively, a is an included angle between a projection of a radiation optical path of a radiometer of benchmark radiometric payload on an XOY plane of the body coordinate system and a positive direction of an X axis, θ is a field-of-view angle of radiometer, and β is an included angle between the radiation optical path of the benchmark radiometric payload radiometer and a projection line thereof on the XOY plane.

In S113, a spatial position where the observation beam intersects with the ground is determined based on the observation beam direction. The step specifically includes step A to step F.

In step A, an average elevation plane of the target region is determined. The average elevation plane of the region is obtained based on an average elevation Zavg of the target region.

In step B, an initial intersection point between the observation beam and the average elevation plane is determined according to the observation beam direction. The initial intersection point is point A1, and a coordinate of the initial intersection point is (X1, Y1).

In step C, a first elevation for the initial intersection point in a DEM (digital elevation model) and a corresponding first elevation plane for the initial intersection point are determined. According to the coordinate of the initial intersection point and the first elevation of the initial intersection point in the DEM, a coordinates of point A2 is obtained to be (X1, Y1, Z1).

In step D, an intersection point between the observation beam direction and the first elevation plane is replaced as the initial intersection point. The point is marked as A3 and has a coordinate of (X2, Y2, Z1).

In step E, a second elevation for the updated initial intersection point in the DEM and a corresponding second elevation plane for the updated initial intersection point are determined. The second elevation of A3 in the DEM is Z2.

In step F, the iterative process from step C to step E is repeated until a difference between the second elevation and the first elevation is less than a first predefined threshold, and the initial intersection point obtained in the final iteration is used as the spatial position where the observation beam intersects with the ground.

In S114, the target region is determined according to the spatial position.

The benchmark radiometric payload is used to observe a certain angular range on the ground, and the observation range on the ground is approximately a circle. In addition to calculating a position (corresponding to the spatial position of the intersection point between the observation beam and the ground calculated in S113) of a center point corresponding to the observation beam, a position of a point on the circumference also needs to be calculated, so as to determine an earth observation range.

Taking a certain point on the circumference as an example, an included angle between the observation beam and the point is half of the field-of-view angle of the payload. Therefore, the included angle between light at the point and the observation beam is decomposed in yaw, pitch and roll directions to obtain a decomposed angle correction, which is then added to an attitude angle of the observation beam to obtain a light attitude angle corresponding to a certain point on the circumference. The light attitude angle is brought into the attitude angles $\omega$, $\varphi$ and $\kappa$ in the above step S112 to perform calculations in steps S112 and S113 so as to obtain a ground point coordinate corresponding to the point on the circumference. Similarly, coordinate positions of other points on the circumference are calculated to obtain a ground coverage.

According to embodiments of the present disclosure, after step S11, observation time and geometric position coordinate information of an observation region may be added to earth observation data of each benchmark radiometric payload. In order to perform a radiation benchmark transfer calibration on a specific remote sensing satellite, it is required to perform the temporal-spatial matching according to an actual transit situation of the remote sensing satellite.

In step S12, a temporal-spatial matching is performed between first observation image data of a target region collected by a benchmark radiometric payload and second observation image data of the target region collected by the satellite-borne payload.

For VNIR and SWIR bands, a main source of radiation is the sun. In conditions characterized by meteorological stability and an absence of extreme weather phenomena, the variability in solar radiative flux typically remains minimal over a 30-minute interval.

In order to further reduce a change in solar radiation caused by a time difference, in the present disclosure, the observation image data of the target region collected by the benchmark radiometric payload is defined as effective synchronous observation data of the satellite payload. The observation image data of the target region is collected within a predetermined time period before and after the time when the remote sensing satellite transits the target region. For example, the observation image data of the target region collected by the benchmark radiometric payload within five minutes (i.e., ten minutes in total) before and after the time when the remote sensing satellite (referred to as satellite) overpasses the target region may be defined as the effective synchronous observation data. Therefore, a plurality of sets of observation data (the number of effective data sets of the benchmark radiometric payload observation is defined as No) that meet the condition are selected from the earth observation data of the benchmark radiometric payload and configured for subsequent processing. For each of the matchups of observation data, a value difference between an acquisition time of first observation image data and an acquisition time of second observation image data is less than a second predefined threshold.

According to embodiments of the present disclosure, in step S2:

It is assumed that $N_b$ radiance of benchmark radiometric payload obtained are respectively $L_{b,1}(\lambda_b,\theta_b)$, $L_{b,2}(\lambda_b,\theta_b)$, ... $L_{b,N_b}(\lambda_b,\theta_b)$ according to $N_b$ groups of benchmark radiometric payload observation image data, and all radiance of benchmark radiometric payload are averaged at each spectral position to obtain the average radiance of the benchmark radiometric payload after spatial aggregation:

$$\overline{L_b(\lambda_b, \theta_b)} = \frac{1}{N_b}\sum_{i=1}^{N_b} L_{b,i}(\lambda_b, \theta_b) \quad (3)$$

The radiance of benchmark radiometric payload is obtained according to a radiometric calibration equation, and the radiometric calibration calculation equation is as follows:

$$L_b(\lambda_b, \theta_b) = a(T, P, t, g, \lambda_b)DN(\lambda_b, \theta_b) + b(T, P, t, g, \lambda_b) \quad (4)$$

Where $L_b$ is the radiance of benchmark radiometric payload (which has an unit of W/m²/sr/μm), $\lambda_b$ represents a wavelength position, $\theta_b$ represents an observation angle, DN is a digital number (dimensionless) of an observation range recorded by the benchmark radiometric payload, and a and b are a radiometric calibration gain and an offset coefficient (which have the same unit as the unit of the radiance of benchmark radiometric payload, W/m²/sr/μm), respectively. Both of a and b are related to a working temperature (T) of radiance of benchmark radiometric payload, a working pressure (P), integration time (t) of radiance of benchmark radiometric payload and a gain stage of the satellite payload (g).

In order to ensure that the benchmark radiometric payload observation of the near-space aerostat may still be traced back to the laboratory measurement benchmark, the coefficients a and b need to be acquired through laboratory measurements during a ground development and testing of the benchmark radiometric payload, and cover at least a working temperature (−70° C. to 20° C.), a working pressure (3 kPa to 101 kPa), different integration time and different gain stage ranges in the near-space environment. In a specific radiometric calibration, the coefficients a and b in the corresponding environment is selected to calculate observation data of benchmark radiometric payload.

According to embodiments of the present disclosure, step S3 includes steps S31 to S32.

In step S31, a plurality of pixels within the target region are determined from the plurality of second observation image data, where each pixel corresponds to a plurality of channels.

In step S32, for each of the plurality of channels, an average value of DNs for a plurality of pixels corresponding to the channel are determined, so as to obtain the average DN corresponding to the channel.

According to the observation range of the benchmark radiometric payload, DNS (DN values) of different channels of a plurality of pixels in the observation range are extracted from a plurality of second observation image data within the plurality of matchups of observation data, which is set as $DN_{s,k,j}$ to represent DN at a position of a $k_{th}$ channel and a $j_{th}$ pixel, and a total of $N_s$ satellite pixels are provided in the coverage, and then the average DN corresponding to the channel collected by the remote sensing satellite is as follows:

$$\overline{DN_{s,k}} = \frac{1}{N_s}\sum_{j=1}^{N_s} DN_{s,k,j} \quad (5)$$

According to embodiments of the present disclosure, step S4 includes steps S41 to S42.

In step S41, a plurality of radiance of benchmark radiometric payload are obtained according to the plurality of first observation image data within the plurality of matchups of observation image data, where each of the first observation image data corresponds to one of the radiance measurements of benchmark radiometric payload.

In step S42, the average radiance of the benchmark radiometric payload is obtained according to the plurality of radiance of benchmark radiometric payload.

Specifically, since the benchmark radiometric payload has a high spectral resolution, and the satellite payload usually has a wide spectral coverage, a spectral matching between the benchmark radiometric payload and the remote sensing satellite payload (referred to as satellite payload) may be realized by convolving the observation data of benchmark radiometric payload and a channel response with a low resolution. A spectral matching method based on convolution is shown as follows.

$$\overline{L_{b,k}(\theta_b)} = \frac{\int_{\lambda_1}^{\lambda_2} S_k(\lambda)\overline{L_b(\lambda_b, \theta_b)}d\lambda}{\int_{\lambda_1}^{\lambda_2} S_k(\lambda)d\lambda} \quad (6)$$

Where $\overline{L_b(\lambda_b,\theta_b)}$ is an average radiance of the benchmark radiometric payload, $S_k(\lambda)$ is a spectral response function of a $k_{th}$ band of the remote sensing satellite, $\lambda_1$ to $\lambda_2$ is a spectral coverage of the $k_{th}$ band, and $\overline{L_{b,k}(\theta_b)}$ is a matching radiance for the observation band of the benchmark radiometric payload corresponding to the remote sensing satellite payload after spectral matching and convolution.

For the satellite payload with a plurality of bands, it is required to convolve each band separately in the step.

According to embodiments of the present disclosure, step S5 includes steps S51 to S52.

In step S51, a theoretical radiance of the satellite payload is obtained according to the matching radiance.

The step specifically includes the following operations.

Two key problems are required to be considered in deducing the matching radiance of the benchmark radiometric payload of a near-space aerostat (near-space aerostat platform) platform to an altitude of the remote sensing satellite. First, considering an altitude difference between the near-space aerostat platform and the satellite, a radiative transfer influence caused by atmosphere between the aerostat platform and the satellite still needs to be considered when the matching radiance observed by the near-space aerostat platform is deduced to a satellite altitude. Second, since a difference usually exists between an angle observed by the aerostat platform and an angle observed by the satellite, a difference between observation direction angles is also one of the factors to be considered.

In order to ensure a higher deduction accuracy, and in consideration of high time and regional window restrictions for a flight of the near-space aerostat, the present disclosure may realize a deduction process by means of a local high-precision earth surface and atmospheric models on the basis of considering the above main technical problems.

According to a theory of atmospheric radiometric transmission, $\overline{L_{b,k}(\theta_b)}$ may be written as follows:

$$\overline{L_{b,k}(\theta_b)} = L_{g,k}(\theta_b)\tau_{g\to bal,k}(\theta_b) + L_{g\to bal,\uparrow,k}(\theta_b) \quad (7)$$

$L_{g,k}$ is an earth surface emergent radiance in the $k_{th}$ band (i.e., a $k_{th}$ channel), $\tau_{g\to bal,k}$ is an atmospheric transmittance from the ground to an aerostat altitude in the $k_{th}$ band, $L_{g\to bal,\uparrow,k}$ is an atmospheric radiation entering the benchmark radiometric payload in the $k_{th}$ band, and $\theta_b$ is an observation zenith angle of the benchmark radiometric payload. It should be noted that all the above items are functions of observation angles of the benchmark radiometric payload, which all represent corresponding physical quantities in an observation angle direction of the benchmark radiometric payload.

Theoretically, an observed radiance of the $k_{th}$ band of the remote sensing satellite payload may be expressed as:

$$L_{s,k}(\theta_s) = L_{g,k}(\theta_s)\tau_{g\to sat,k}(\theta_s) + L_{g\to sat,\uparrow,k}(\theta_s) \quad (8)$$

In the equation, $L_{s,k}$ is a radiance received at the satellite altitude in the $k_{th}$ band, $L_{g,k}$ is an earth surface emergent radiance in the $k_{th}$ band, $\tau_{g\to sat,k}$ is an atmospheric transmittance from the ground to an altitude of the remote sensing satellite in the $k_{th}$ band, $L_{g\to sat,\uparrow,k}$ is an atmospheric radiation entering the remote sensing satellite payload in the $k_{th}$ band, and $\theta_s$ is an observation zenith angle of the remote sensing satellite payload. It should be noted that the above items are all functions of the observation angles of the remote sensing satellite payload, which all represent corresponding physical quantities in an observation angle direction of the remote sensing satellite.

Compared with the radiance observed by the near-space aerostat platform and the remote sensing satellite, a theoretical truth deduction mainly includes the following processing.

For the earth surface emergent radiance term, a conversion between an observation direction of the benchmark radiometric payload and an observation direction of the remote sensing satellite payload is mainly considered, which may be realized by using an earth surface BRDF model. Under the same condition, a change of the earth surface emergent radiation caused by only a change of the observation angle is similar to a change of BRDF in two directions, i.e., $$\frac{L_{g,k}(\theta_b)}{L_{g,k}(\theta_s)} = \frac{BRDF(\theta_b)}{BRDF(\theta_v)} \quad (9)$$

In the equation, BRDF represents a bidirectional reflection distribution function. The BRDF is obtained according to an actual measured value of the earth surface in a flight operation region of the near-space aerostat. Considering a difficulty of general BRDF field measurements, the item may also be replaced with the BRF.

For the atmospheric transmittance term, on the one hand, an observation angle of the near-space benchmark radiometric payload is inconsistent with an observation angle of the satellite payload. According to the definition of the atmospheric transmittance, a difference of the same air mass caused by a radiative transfer direction is a function of the cosine of an incident angle. Therefore, in a specific atmospheric condition, $\tau_{g\to bal,k}(\theta_b)$ is first converted into $\tau_{g\to bal,k}(\theta_s)$ by a specific equation:

$$\tau_{g\to bal,k}(\theta_s) = \tau_{g\to bal,k}(\theta_b)\cos(\theta_b)/\cos(\theta_s) \quad (10)$$

In the equation, $\tau_{g\to bal,k}(\theta_b) = RTM_{local}(A,\theta_b)$, and $RTM_{local}$ represents a local high-precision atmospheric radiometric transmission model suitable for an aerostat operation region. The model needs to be re-parameterized by using a historical atmospheric background within an operation region range on the basis of a current general atmospheric radiative transfer model, so as to improve a model accuracy. A represents an atmospheric profile parameter during data acquisition. In an absence of the local high-precision atmospheric radiative transfer model, a general atmospheric radiative transfer model may also be used instead.

In general, the atmospheric profile parameter obtained during experiments is difficult to reach the satellite altitude directly. Therefore, a transmittance portion $\tau_{bal\to sat,k}(\theta_s)$ of atmosphere between an altitude of the aerostat platform and an altitude of the satellite platform under the observation zenith angle of the remote sensing satellite may be collected by means of regional atmospheric background simulation with a support of the local high-precision atmospheric radiative transfer model.

The transmittance $\tau_{g\to sat,k}(\theta_s) = \tau_{g\to bal,k}(\theta_s)\tau_{bal\to sat,k}(\theta_s)$ from the ground to the satellite altitude may be finally obtained from the above two portions.

For the atmospheric radiation term, both $L_{g\to bal,k}(\theta_b)$ and $L_{g\to sat,\uparrow,k}(\theta_s)$ may be calculated by $RTM_{local}$.

By processing the above-mentioned three parameters, it may be obtained that:

$$L_{s,k}(\theta_s) = \overline{L_{b,k}(\theta_b)} \cdot \frac{BRDF(\theta_s)}{BRDF(\theta_b)} \cdot \frac{\cos(\theta_b)}{\cos(\theta_s)} \cdot \tau_{bal\to sat,k}(\theta_s) + \\ L_{g\to sat,\uparrow,k}(\theta_s) - L_{g\to bal,\uparrow,k}(\theta_b) \quad (11)$$

According to the above-mentioned equation, in combination with observed angle information and necessary atmospheric state information, the radiance observed by the benchmark radiometric payload carried by the near-space aerostat platform may be converted into a radiance of the satellite altitude. In general, since a flight altitude of the near-space aerostat platform is relatively high, $\tau_{bal\to sat,k}(\theta_s)$ is approximately 1, and $L_{g\to sat,\uparrow,k}(\theta_s)-L_{g\to bal,\uparrow,k}(\theta_b)$ is approximately 0 (when the flight altitude is above 35 km, a difference caused by the approximation is less than 5‰). In this case, the theoretical radiance of the remote sensing satellite payload is:

$$L_{s,k}(\theta_s) = \overline{L_{b,k}(\theta_b)} \cdot \frac{BRDF(\theta_s)}{BRDF(\theta_b)} \cdot \frac{\cos(\theta_b)}{\cos(\theta_s)} \quad (12)$$

In step S52, the calibration coefficient of the satellite payload is obtained according to the theoretical radiance and the average DN.

According to the principle of satellite payload calibration, $\overline{DN_{s,k}}$ in a corresponding region of the satellite payload and $L_{s,k}(\theta_s)$ has a relationship as follows:

$$L_{s,k}(\theta_s) = \text{gain} \cdot \overline{DN_{s,k}} + \text{bias} \quad (13)$$

In the equation, gain is a radiometric calibration gain coefficient of the band, and bias is a radiometric calibration offset coefficient of the band.

When a plurality of flight data of the near aerostat is acquired, or the same flight passes through a plurality of underlying surfaces, a plurality of $\overline{DN_{s,k}}$ and $L_{s,k}(\theta_s)$ may be acquired, and gain and bias may be determined by least square fitting. When only valid data of one time is provided, the bias may be set as an existing calibration bias coefficient of the current remote sensing satellite, and then may be directly calculated to obtain a calibration gain coefficient.

According to embodiments of the present disclosure, the above-mentioned remote sensing satellite transfer calibration method further includes: performing an uncertainty analysis on the calibration coefficient.

The core of the transfer calibration method is to provide an uncertainty in addition to the calibration coefficient itself. In the present disclosure, the uncertainty of the calibration coefficient includes five items: an observation uncertainty of the benchmark radiometric payload of the near-space aerostat, a radiation quantity transfer uncertainty caused by a temporal-spatial matching of aerostat-satellite data, a radiation quantity transfer uncertainty caused by a spectral matching of aerostat-satellite data, an uncertainty of the local high-precision atmospheric radiometric transfer model, and an uncertainty of the theoretical truth deduction of the satellite altitude. A final overall uncertainty synthesis may be realized based on a basic uncertainty propagation theory.

Figure 2:
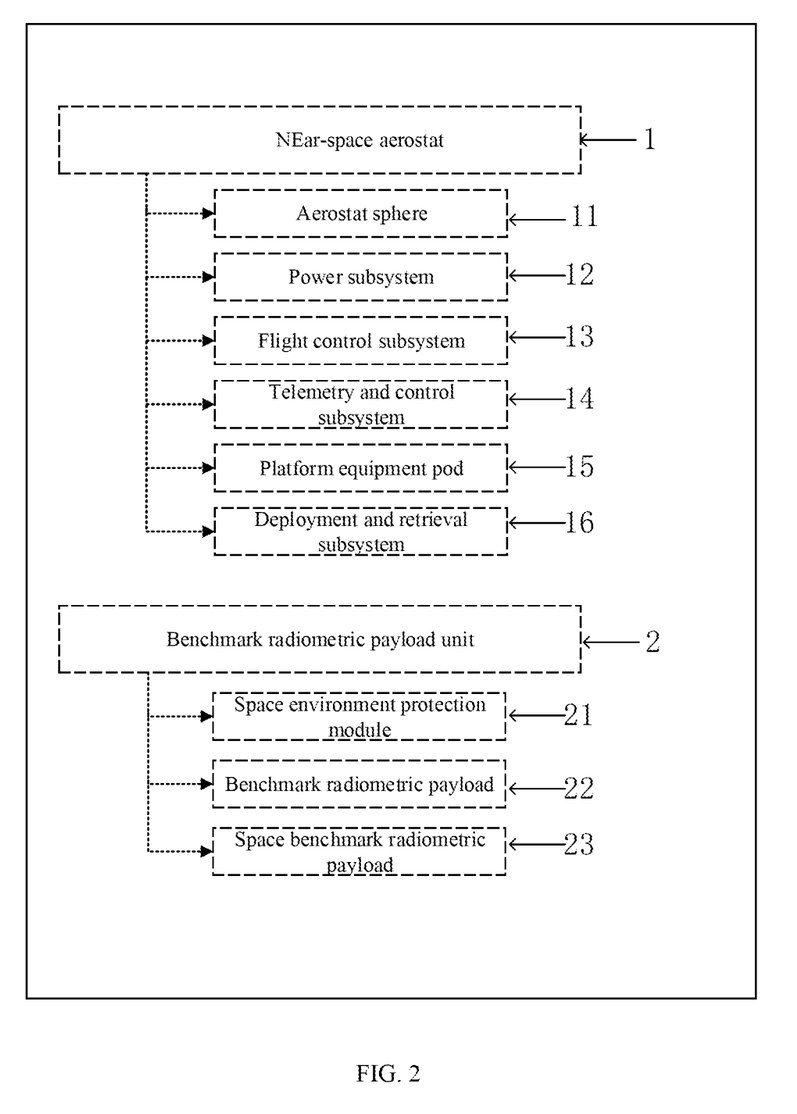
FIG. 2 schematically shows a structural framework of the near-space aerostat system according to embodiments of the present disclosure.

FIG. 2 schematically shows a structural block diagram of a near-space aerostat system according to embodiments of the present disclosure.

As shown in FIG. 2, the near-space aerostat system provided by embodiments of the present disclosure includes two subsystems: a near-space aerostat 1 and a benchmark radiometric payload unit 2, where the benchmark radiometric payload unit 2 is carried by the near-space aerostat 1. The near-space aerostat 1 may be a zero-pressure aerostat.

The near-space aerostat 1 is selected as the platform mainly due to a comprehensive consideration of a platform load, a difficulty in integrated development, etc. Taking the zero-pressure aerostat as the near-space aerostat 1 as an example, the near-space aerostat 1 may include an aerostat sphere 11, a power subsystem 12, a flight control subsystem 13, a telemetry and control subsystem 14, a platform equipment pod 15 and a deployment and retrieval subsystem 16. The aerostat sphere 11 provides enough lift for the near-space aerostat system; the power subsystem 12 mainly includes a battery and power control device, which provides power for a normal operation of the device in the near-space aerostat system; the flight control subsystem 13 and the telemetry and control subsystem 14 are key cores configured for the aerostat to control the near-space aerostat system; the platform equipment pod 15 is responsible for loading energy, and the flight control subsystem 13 and the telemetry and control subsystem 14 are configured for the deployment and retrieval subsystem 16, thereby ensuring recycling of the near-space aerostat 1 and the benchmark radiometric payload unit 2. The power subsystem 12 in the aerostat platform may provide energy for the benchmark radiometric payload, and the telemetry and control subsystem 14 may provide a necessary data transmission link for the benchmark radiometric payload 22.

The benchmark radiometric payload unit 2 mainly includes a space environment protection module 21 traceable to a laboratory benchmark, a benchmark radiometric payload 22 and a space benchmark radiometric payload 23. In order to meet matching requirements of as many remote sensing satellites as possible, the benchmark radiometric payload 22 requires as high a spectral resolution as possible. Generally, a visible-near infrared (VNIR) spectral resolution is less than 5 nm, and a short-wave infrared spectral resolution (SWIR) is less than 10 nm. In addition, if possible, the space benchmark radiometric payload 23 may be carried to further improve a measurement accuracy of earth observation. In order to ensure an accurate spatial position relationship between earth observation payload data and remote sensing satellite observation, a position and attitude measurement system (POS) is also required to be carried by the near-space aerostat 1 to measure position and attitude information of the near-space aerostat at exposure time of the benchmark radiometric payload.

The benchmark radiometric payload 22 is carried by the near aerostat 1. An earth observation is performed after the benchmark radiometric payload 22 rises to an altitude of the near-space, and the radiation benchmark transfer calibration is performed by means of the observation data of the ground and the target region synchronized with the remote sensing satellite.

According to embodiments of the present disclosure, the near-space aerostat 1, which serves as a platform, may work in an altitude range of 18 km to 50 km. The content of atmospheric components above the altitude has a relatively constant influence on the atmospheric radiative transfer, while the influence of troposphere with complicated atmospheric temporal and spatial changes on the atmospheric radiative transfer process may be observed by the benchmark radiometric payload 22, which may greatly reduce the uncertainty caused by atmospheric factors in the traditional alternative calibration process and hopefully improve the accuracy of the remote sensing satellite calibration by leaps and bounds.

According to embodiments of the present disclosure, the near-space aerostat 1, which serves as the platform, has an advantage of regional resident observation, which may increase opportunities for cross-matching with the satellites. At the same time, the near-space aerostat 1 has an advantage of being recyclable, which may facilitate a calibration of the benchmark radiometric payload carried thereon before and after the flight. The present disclosure serves as an effective supplement to the "calibration satellite" while reducing the cost of remote sensing satellites. They also serve as an early verification technique for the benchmark radiometric payload of the "calibration satellite".

According to embodiments of the present disclosure, when the observation data of the benchmark radiometric payload 22 is compared with remote sensing satellite payload data, problems of temporal-spatial matching and spectrum matching between the payloads needs to be fully considered, and an accuracy of satellite radiometric calibration may be further improved through a temporal-spatial spectrum angle conversion by ensuring a consistency of the two in observation elements and fully considering uncertainties such as an observation time difference, an observation angle difference, an atmospheric radiative transfer path change, etc. during transmission of the benchmark radiometric payload 22 to the altitude of the remote sensing satellite.

According to embodiments of the present disclosure, uncertainties of different links are accurately calculated while obtaining the calibration coefficient, and finally an uncertainty of the calibration coefficient for different remote sensing satellites is provided. Such result descriptions with uncertainty may ensure a traceability of data quality of different series of remote sensing satellites using the method, and ensure a consistency and a comparability of multi-satellite data qualities.

The above-mentioned specific embodiments further describe the objectives, technical solutions and advantages of the present disclosure in detail. It should be understood that the above are only specific embodiments of the present disclosure and are not intended to limit the present disclosure. Any modifications, equivalent substitutions, improvements, etc. made within the spirit and principle of the present disclosure shall be included in the scope of protection of the present disclosure.

What is claimed is:

1. An optical satellite remote sensing transfer calibration method based on a near-space aerostat, comprising:
    performing a temporal-spatial matching between first observation image data of a target region collected by a benchmark radiometric payload and second observation image data of the target region collected by a satellite payload which is mounted, so as to obtain a plurality of matchups of observation image data, wherein the benchmark radiometric payload is carried by the near-space aerostat, and each of the matchups of observation image data comprises the first observation image data and the second observation image data, with matching conducted both in terms of time and spatial location;
    obtaining an average radiance of the benchmark radiometric payload from the first observation image data within the plurality of matchups of observation image data;
    obtaining an average DN (digital number) captured by the satellite payload in the target region from the second observation image data within the plurality of matchups of observation image data;
    obtaining a matching radiance for an observation band of the benchmark radiometric payload corresponding to the satellite payload based on the average radiance of the benchmark radiometric payload; and
    obtaining a calibration coefficient of the satellite payload based on the matching radiance and the average DN,
    wherein a method of determining the target region comprises:
    acquiring position data and attitude data of the space aerostat;
    obtaining an observation beam direction of the benchmark radiometric payload to the target region based on the position data and the attitude data;
    determining a spatial position where an observation beam intersects with a ground based on the observation beam direction; and
    determining the target region according to the spatial position,
    wherein the determining a spatial position where an observation beam intersects with a ground based on the observation beam direction comprises:
    step A: determining an average elevation plane of the target region;
    step B: determining an initial intersection point between the observation beam and the average elevation plane based on the observation beam direction;
    step C: determining a first elevation for the initial intersection point in a DEM (digital elevation model) and a corresponding first elevation plane for the initial intersection point;
    step D: determining an intersection point between the observation beam direction and the first elevation plane, and determining the intersection point as an updated initial intersection point;
    step E: determining a second elevation for the updated initial intersection point in the DEM and a corresponding second elevation plane for the updated initial intersection point; and
    step F: repeating the iterative process from step C to step E until a difference between the second elevation and the first elevation is less than a first predefined threshold, and using the initial intersection point obtained in the final iteration as the spatial position where the observation beam intersects with the ground.

2. The optical satellite remote sensing transfer calibration method according to claim 1, wherein the obtaining a calibration coefficient of the satellite payload based on the matching radiance and the average DN comprises:
    obtaining a theoretical radiance of the satellite payload based on the matching radiance; and
    obtaining the calibration coefficient of the satellite payload based on the theoretical radiance and the average DN.

3. The optical satellite remote sensing transfer calibration method according to claim 2, wherein the calibration coefficient comprises a calibration gain coefficient and a calibration offset coefficient; and
    wherein the obtaining the calibration coefficient of the satellite payload based on the theoretical radiance and the average DN comprises:
    processing the theoretical radiance and the average DN by using a least squares method, so as to obtain the calibration gain coefficient and the calibration offset coefficient of the satellite payload.

4. The optical satellite remote sensing transfer calibration method according to claim 1, wherein the obtaining an average radiance of the benchmark radiometric payload from the first observation image data within the plurality of matchups of observation image data comprises:
    obtaining a plurality of radiance of benchmark radiometric payload from the first observation image data within the plurality of matchups of observation image data, wherein each first observation image data corresponds to one of the radiance of the benchmark radiometric payload; and
    obtaining the average radiance of the benchmark radiometric payload based on the plurality of radiance of benchmark radiometric payload.

5. The optical satellite remote sensing transfer calibration method according to claim 1, wherein the obtaining an average DN captured by the satellite payload in the target range from the second observation image data within the plurality of matchups of observation image data comprises:

extracting DNs of different channels of a plurality of pixels in the target range from the second observation image data within the plurality of matchups of observation image data; and obtaining the average DN of the target range collected by the satellite payload based on the DNs of the different channels of the plurality of pixels.

6. The optical satellite remote sensing transfer calibration method according to claim 1, wherein the temporal matching comprises:

for each of the matchups of observation image data, a difference value between an acquisition time of the first observation image data and an acquisition time of the observation image data being less than a second predefined threshold.

7. The optical satellite remote sensing transfer calibration method according to claim 1, wherein the obtaining an average DN captured by the satellite payload in the target region from the second observation image data within the plurality of matchups of observation image data comprises:

determining a plurality of pixels within the target region from the second observation image data, wherein each of the pixels correspond to a plurality of channels; and determining, for each channel of the plurality of channels, an average value of DNs for a plurality of pixels corresponding to the channel, so as to obtain the average DN corresponding to the channel.

8. The optical satellite remote sensing transfer calibration method according to claim 1, wherein a flight altitude range of the near-space aerostat is between 18 km to 50 km; and spectral resolution of visible-near infrared of the benchmark radiometric payload is less than 5 nm, and spectral resolution of short-wave infrared of the benchmark radiometric payload is less than 10 nm.

* * * * *